United States Patent
Wang et al.

(10) Patent No.: US 12,445,219 B2
(45) Date of Patent: Oct. 14, 2025

(54) AIR INTERFACE TIME SERVICE METHOD FOR MOBILE TERMINAL, MOBILE TERMINAL AND READABLE STORAGE MEDIUM

(71) Applicant: ZTE CORPORATION, Shenzhen (CN)

(72) Inventors: Chenglong Wang, Shenzhen (CN); Jiangpeng Zhou, Shenzhen (CN); Fan Bai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 367 days.

(21) Appl. No.: 18/007,399

(22) PCT Filed: Nov. 22, 2021

(86) PCT No.: PCT/CN2021/132129
§ 371 (c)(1),
(2) Date: Jan. 30, 2023

(87) PCT Pub. No.: WO2022/111418
PCT Pub. Date: Jun. 2, 2022

(65) Prior Publication Data
US 2023/0291488 A1    Sep. 14, 2023

(30) Foreign Application Priority Data
Nov. 30, 2020  (CN) .......................... 202011375248.8

(51) Int. Cl.
*H04J 3/06*       (2006.01)
*H04W 56/00*      (2009.01)

(52) U.S. Cl.
CPC ......... *H04J 3/0638* (2013.01); *H04W 56/001* (2013.01)

(58) Field of Classification Search
CPC ...... H04J 3/0602; H04J 3/0635; H04J 3/0638; H04W 56/001
See application file for complete search history.

(56) References Cited

U.S. PATENT DOCUMENTS 9,913,231 B2 *  3/2018  Do .................... H04W 56/0015
10,129,844 B2 * 11/2018  Wang .................... H04L 7/0087
(Continued)

FOREIGN PATENT DOCUMENTS

CN    104349450 A    2/2015
CN    105119677 A    12/2015
(Continued)

OTHER PUBLICATIONS

The State Intellectual Property Office of People's Republic of China. Second Office Action and Search Report for CN Application No. 202011375248.8 and English translation, mailed Mar. 26, 2025, pp. 1-18.

(Continued)

*Primary Examiner* — Alpus Hsu
(74) *Attorney, Agent, or Firm* — Vivacqua Crane, PLLC (57) ABSTRACT

A timing method over air interface, a mobile terminal device and a readable storage medium are disclosed. The method may include: receiving a broadcast message transmitted by a base station, the broadcast message including a time synchronization message; when a synchronization time source is the time synchronization message, executing a time synchronization strategy to determine whether the time precision of the base station satisfies a preset condition; if the time precision of the base station satisfies the preset condition, continuously using the time synchronization message as the synchronization time source; and, if the time (Continued)

S101 Receive a broadcast message transmitted by a base station

S102 When a synchronization time source is the time synchronization message, execute a time synchronization strategy to determine whether the time precision of the base station satisfies a preset condition S103 Continuously use the time synchronization message as the synchronization time source S104 Use locally maintained time information as the synchronization time source precision of the base station does not satisfying the preset condition, using local maintenance time information as the synchronization time source.

20 Claims, 4 Drawing Sheets (56) References Cited

U.S. PATENT DOCUMENTS

| | | | |
|---|---|---|---|
| 10,257,798 | B1 | 4/2019 | Koelemeij et al. |
| 10,462,762 | B2* | 10/2019 | Hollar ................ H04W 56/006 |
| 10,772,055 | B2* | 9/2020 | Da ..................... H04W 56/002 |
| 2009/0172455 | A1 | 7/2009 | Pind |
| 2014/0250972 | A1 | 9/2014 | Achanta et al. |
| 2016/0302165 | A1* | 10/2016 | Da ..................... H04W 56/001 |
| 2017/0127368 | A1* | 5/2017 | Wang ............... H04W 56/0015 |
| 2019/0239204 | A1* | 8/2019 | Zhang ................. H04L 5/0094 |
| 2019/0268863 | A1* | 8/2019 | Chen .................. H04L 5/0053 |
| 2020/0053679 | A1* | 2/2020 | Bendlin .............. H04W 92/02 |
| 2020/0162878 | A1* | 5/2020 | Zhuang ................. H04W 4/40 |
| 2020/0413360 | A1* | 12/2020 | Ruffini ............ H04W 56/0015 |
| 2021/0014816 | A1* | 1/2021 | Bendlin .............. H04B 7/2693 |
| 2021/0211215 | A1 | 7/2021 | Zhu et al. |
| 2021/0274456 | A1* | 9/2021 | Katayama ............ H04W 56/00 |
| 2022/0167291 | A1 | 5/2022 | Li |

FOREIGN PATENT DOCUMENTS

| | | |
|---|---|---|
| CN | 105122908 A | 12/2015 |
| CN | 110061797 A | 7/2019 |
| CN | 110140301 A | 8/2019 |
| CN | 110248404 A | 9/2019 |
| CN | 110267200 A | 9/2019 |
| CN | 111865466 A | 10/2020 |
| CN | 111884745 A | 11/2020 |
| CN | 111901864 A | 11/2020 |
| JP | 2010263511 A | 11/2010 |
| JP | 2013113618 A | 6/2013 |
| JP | 2013162454 A | 8/2013 |
| KR | 20150128426 A | 11/2015 |

OTHER PUBLICATIONS

3GPP Technical Specification Group Radio Access Network. "Clock drift issue on IIOT," 3GPP TSG-RAN Meeting #88e, 2020, pp. 1-4.
International Searching Authority. International Search Report and Written Opinion for PCT Application No. PCT/CN2021/132129 and English translation, mailed Feb. 17, 2022, pp. 1-10.
The State Intellectual Property Office of People's Republic of China. First Office Action for CN Application No. 202011375248.8 and English translation, mailed Sep. 30, 2024, pp. 1-9.
The State Intellectual Property Office of People's Republic of China. First Search Report for CN Application No. 202011375248.8 and English translation, mailed Sep. 30, 2024, pp. 1-6.
Japan Patent Office. Notice of Reasons for Refusal for JP Application No. 2023-504818 and English translation, mailed Feb. 2, 2024, pp. 1-10.
Intellectual Property Office of Singapore. Examination Report for SG Application No. 11202300695U, mailed Aug. 15, 2025, pp. 1-12.

* cited by examiner

S101 Receive a broadcast message transmitted by a base station

S102 When a synchronization time source is the time synchronization message, execute a time synchronization strategy to determine whether the time precision of the base station satisfies a preset condition S103 Continuously use the time synchronization message as the synchronization time source S104 Use locally maintained time information as the synchronization time source

AIR INTERFACE TIME SERVICE METHOD FOR MOBILE TERMINAL, MOBILE TERMINAL AND READABLE STORAGE MEDIUM

CROSS-REFERENCE TO RELATED APPLICATION

This application is a national stage filing under 35 U.S.C. § 371 of international application number PCT/CN2021/132129, filed Nov. 22, 2021, which claims priority to Chinese patent application No. 202011375248.8 filed on Nov. 30, 2020. The contents of these applications are incorporated herein by reference in their entirety.

TECHNICAL FIELD

Embodiments of the present disclosure relate to, but not limited to, the technical field of wireless communication, and in particular to, but not limited to, a timing method over air interface for a mobile terminal device, a mobile terminal device, and a readable storage medium.

BACKGROUND

With the rapid development of the wireless communication technology, a network system in which everything is interconnected has been gradually formed in various fields, and more and more device entities are connected to the Internet through the wireless communication technology, which requires that high-precision time synchronization must be maintained among devices to reliably complete the same instruction.

In the applications of the wireless communication technology, conventional terminal devices must be provided with the Global Positioning System (GPS)/Beidou systems for time synchronization, which incurs high cost. With the application of the timing over air interface technology in 5G, the base station can synchronize the time information to the terminal device by broadcasting the system message through an air interface, so that high-precision time synchronization is maintained between the terminal device and the base station. However, according to the test practice, it has been found that the existing timing schemes over air interface can only support application scenarios of fixed-point terminal devices, and there are the following disadvantages in the process of popularization and application of the schemes. First, in an application scenario where the application terminal device is mobile, when the terminal device is switched among different signal strength ranges covered by the base station, the existing timing schemes over air interface cannot ensure the precision of time synchronization between the terminal device and the base station. Second, the terminal device will frequently switch the access network device according to the actual received signal quality, so the existing timing schemes over air interface cannot ensure the timing precision of the base station in the switching process. To sum up, when the terminal device is moved or switched under different signal qualities, it is unreliable to synchronize the clock signal of the base station using the related timing over air interface technology. Therefore, in the context where the 5G communication technology is commercially popularized gradually, it is disadvantageous for the application and popularization of the timing over air interface technology.

SUMMARY

The embodiments of the present disclosure provide a timing method over air interface for a mobile terminal device, a mobile terminal device and a readable storage medium, in order to at least address one of the above related technical problems to a certain extent, including the problem of low precision of time synchronization when the existing timing over air interface technology is applied in a mobile terminal device.

In view of the above, an embodiment of the present disclosure provides a timing method over air interface for a mobile terminal device. The method may include: receiving a broadcast message transmitted by a base station, the broadcast message including a time synchronization message; in response to a synchronization time source being the time synchronization message, executing a time synchronization strategy to determine whether time precision of the base station satisfies a preset condition; in response to the time precision of the base station satisfying the preset condition, continuously using the time synchronization message as the synchronization time source; and, in response to the time precision of the base station not satisfying the preset condition, using locally maintained time information as the synchronization time source.

An embodiment of the present disclosure further provides a mobile terminal device. The device may include: a processor, a memory, and a communication bus, where the communication bus is configured to realize communication between the processor and the memory; and, the processor is configured to execute at least one program stored in the memory to perform the timing method over air interface for a mobile terminal device provided in the embodiments of the present disclosure.

An embodiment of the present disclosure further provides a computer-readable storage medium storing at least one program which, when executed by at least one processor, causes the at least one processor to perform the timing method over air interface for a mobile terminal device provided in the embodiments of the present disclosure.

Other features and corresponding beneficial effects of the present disclosure will be described in the later part of the description, and it should be understood that at least some of the beneficial effects will become apparent from the records in the description of the present disclosure.

DETAILED DESCRIPTION

To make the objectives, technical schemes and advantages of the present disclosure clear, the embodiments of the present disclosure will be further described below in detail by specific implementations in conjunction with the accompanying drawings. It should be understood that the specific embodiments described herein are merely used for illustrating the present disclosure, and are not intended to limit the present disclosure.

Example Embodiment One

In order to solve the problem of timing and time synchronization of a mobile terminal device and improve the time synchronization precision during the movement process, an embodiment of the present disclosure provides a timing method over air interface for a mobile terminal device. The mobile terminal device does not have to access to the GPS/Beidou system, so the application cost is reduced. The problem that the timing over air interface technology cannot ensure the timing precision when the mobile terminal device or terminal device switches the access network device can be effectively solved. Moreover, the time synchronization of the mobile terminal device is realized, and the time synchronization precision of the mobile terminal device during the movement process is improved.

Figure 1:
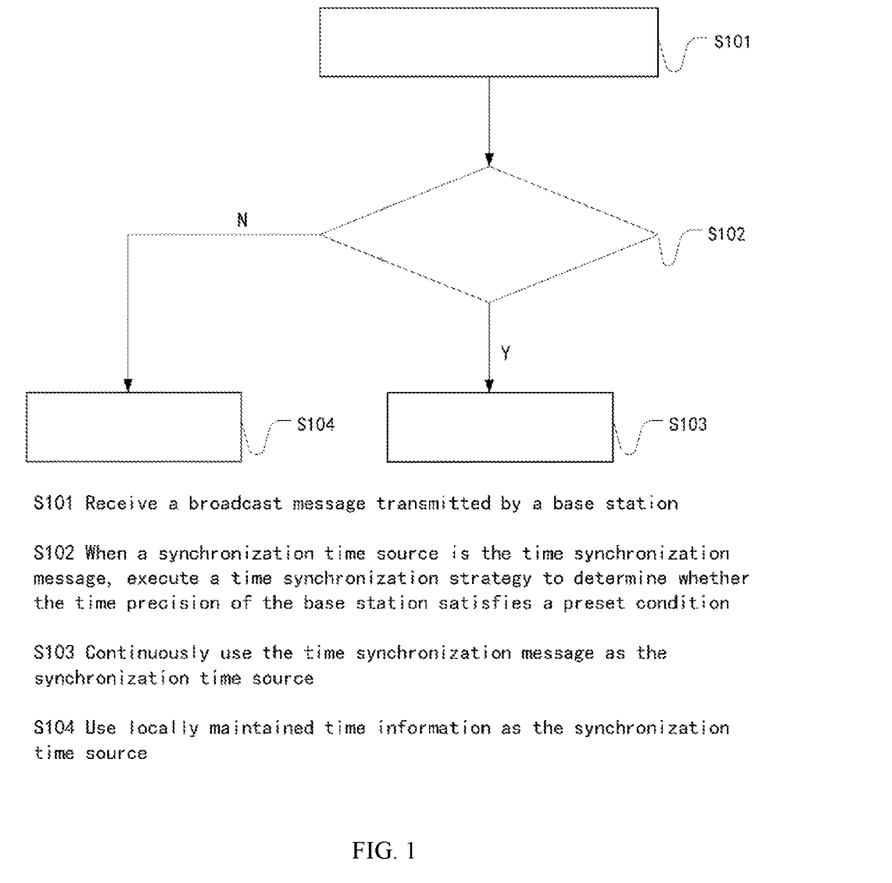
FIG. 1 is a flowchart of a timing method over air interface for a mobile terminal device according to example Embodiment one of the present disclosure.

With reference to FIG. 1, FIG. 1 is a flowchart of a timing method over air interface for a mobile terminal device according to this embodiment. The timing method over air interface for a mobile terminal device includes the following steps S101 to S104.

At S101, a broadcast message transmitted by a base station is received.

In this embodiment, the base station transmits a broadcast message in a broadcasting manner, and the terminal device receives the broadcast message when time synchronization is required. The broadcast message includes a time synchronization message, and the synchronization time broadcast by the base station can be known through the time synchronization message in the broadcast message.

At S102, when a synchronization time source is the time synchronization message, a time synchronization strategy is executed to determine whether the time precision of the base station satisfies a preset condition.

In this embodiment, a time synchronization strategy is executed, and it can be determined whether the synchronization time received from the base station broadcasting the message satisfies the time precision requirement by determining whether the preset condition is satisfied. By executing the time synchronization strategy to determine the synchronization time of the base station to determine whether the time precision satisfies the preset condition, it can be determined whether the synchronization time currently received from the base station broadcasting the message is precise, and then it is determined whether the mobile terminal device uses the time synchronization message in the broadcast message as a time synchronization source or uses locally maintained time information as the time synchronization source.

At S103, when the time precision of the base station satisfies the preset condition, the time synchronization message is continuously used as the synchronization time source.

When it is determined that the synchronization time precision of the base station satisfies the preset condition, it is determined that the currently received synchronization time information of the base station can be used as the synchronization time source, and the mobile terminal device can use the time synchronization message in the broadcast message for time synchronization.

At S104, when the time precision of the base station does not satisfy the preset condition, locally maintained time information is used as the synchronization time source.

When it is determined that the synchronization time precision of the base station does not satisfy the preset condition, in order to ensure the precision of the synchronization time, the locally maintained time information of the mobile terminal device is used as the synchronization time source for time synchronization. In this embodiment, the synchronization time used by the mobile terminal device is preferentially the time of the base station, and the locally maintained time is used only when the synchronization time of the base station does not satisfy the precision requirement.

In other embodiments, executing a time synchronization strategy to determine whether the time precision of the base station satisfies a preset condition includes: acquiring and updating a signal strength of the base station in real time, determining whether a change value of the signal strength is greater than or equal to a preset strength change threshold, determining that the time precision of the base station does not satisfy the preset condition when the change value of the signal strength is greater than or equal to the preset strength change threshold, and determining that the time precision of the base station satisfies the preset condition when the change value of the signal strength is less than the preset strength change threshold; or, acquiring and updating, by the mobile terminal device, the signal strength of the base station in real time, determining whether a signal strength value is greater than or equal to a preset signal strength threshold, determining that the time precision of the base station satisfies the preset condition when the signal strength value is greater than or equal to the preset signal strength threshold, and determining that the time precision of the base station does not satisfy the preset condition when the signal strength value is less than the preset signal strength threshold.

Upon receiving the broadcast signal from the base station, the mobile terminal device can acquire and update in real time a received signal strength of the base station broadcasting the signal. By determining whether the change value of the signal strength is greater than or equal to the preset strength change threshold, the mobile terminal device can determine whether the synchronization time transmitted by the base station is precise and satisfies the time precision requirement, i.e., whether the preset condition is satisfied; or, by determining whether the signal strength value is greater than or equal to the preset signal strength threshold, the mobile terminal device can determine whether the synchronization time transmitted by the base station is precise and satisfies the time precision requirement, i.e., whether the preset condition is satisfied. Here, the change value of the signal strength and the signal strength value can be used to indicate the time precision of the synchronization time of the base station. A smaller signal change value of the base station indicates a higher time precision of the base station. Similarly, a larger signal strength value indicates a higher time precision of the base station. It is to be noted that, the signal strength is used as the basis for determining the time precision of the synchronization time in this embodiment; however, in practical applications, it is also possible to use other basis for determining the time precision of the base station, for example, a signal interference strength value, a distance from the terminal device to the base station, a movement speed of the mobile terminal device, etc.

In the timing method over air interface for a mobile terminal device provided in this embodiment, the mobile terminal device can dynamically select the time synchronization source according to the signal quality and the local time output by the terminal device. It is to be noted that the preset signal strength threshold is a preset value, and its specific numerical value can be flexibly set according to actual situations.

By determining the signal strength change value of the base station, the stability of the broadcast information transmitted by the base station can be determined, and the mobility of the mobile terminal device can also be determined. For example, the signal change value when the user moves quickly is usually greater than that when the user moves slowly. Thus, the time precision of the base station that currently transmits the broadcast information is determined.

In other embodiments, when the time precision of the base station does not satisfy the preset condition, the method further includes: determining whether the locally maintained time information satisfies a precision holding threshold; if the locally maintained time information satisfies the precision holding threshold, using the locally maintained time information as the synchronization time source; and, if the locally maintained time information does not satisfy the precision holding threshold, continuously using the time synchronization message as the synchronization time source.

Since the time precision of the locally maintained time information gradually reduces over time, when the mobile terminal device determines that the time precision of the base station does not satisfy the preset condition, it is also necessary to determine whether the locally maintained time information is greater than the precision holding threshold. The precision holding threshold is used to indicate a deviation value of the time precision. A larger deviation value indicates a lower time precision. Only when the locally maintained time is within the precision holding threshold, the locally maintained time will be selected as the synchronization time source; otherwise, the time synchronization message is continuously used as the synchronization time source. Generally, the reliability of the synchronization time of the base station is higher than that of the locally maintained synchronization time. Therefore, when the locally maintained synchronization time does not satisfy the time synchronization requirement, the synchronization time information of the base station is still selected as the synchronization time source.

In other embodiments, when the locally maintained time information is used as the synchronization time source, the method further includes: determining whether the locally maintained time information satisfies the precision holding threshold; if the locally maintained time information satisfies the precision holding threshold, continuously using the locally maintained time information as the synchronization time source; and, if the locally maintained time information does not satisfy the precision holding threshold, receiving the broadcast message transmitted by the base station, and using the time synchronization message of the base station as the synchronization time source.

Since the time precision of the synchronization time of the locally maintained time information gradually reduces over time, when the synchronization time source uses the locally maintained time, it is necessary to determine in real time whether the locally maintained time information satisfies the precision holding threshold; and, when the locally maintained time information does not satisfy the precision holding threshold, the broadcast message transmitted by the base station needs to be continuously received, and the synchronization time information is acquired from the base station to be used as the time synchronization source.

In other embodiments, when the time synchronization message is used as the synchronization time source, the method further includes: reading the locally maintained time information in real time, and determining whether the locally maintained time information satisfies the precision holding threshold; if the locally maintained time information satisfies the precision holding threshold, keeping the locally maintained time information unchanged; and, if the locally maintained time information does not satisfy the precision holding threshold, receiving the broadcast message transmitted by the base station, and using the time synchronization message of the base station as the synchronization time source.

In order to maintain the freshness of the locally maintained time information and ensure the time precision when the mobile terminal device uses the locally maintained time information as the time synchronization source, the locally maintained time still needs to be maintained and updated when not in use.

In accordance with the above records, in the timing method over air interface for a mobile terminal device provided in this embodiment, when the signal strength is changed too fast due to that the terminal device is within the signal strength ranges of difference scenarios, the locally maintained time is output to maintain the time synchronization precision. When it is detected within the terminal device holding capability range that a change range of the signal strength value is stable within a set threshold, it can be considered that the terminal device moves within the signal strength range of the same scenario, and the terminal device synchronizes the time information of the base station at this time. When it is detected that the terminal device keeps an output local time to exceed the terminal device holding capability, i.e., being greater than the precision holding threshold, the terminal device instantly synchronizes the time information of the base station.

In other embodiments, the precision holding threshold includes: a maintenance duration threshold using the locally maintained time as the time synchronization source.

The maintenance duration threshold refers to the duration of the synchronization time acquired when the locally maintained time is last updated. Since the precision of the locally maintained time gradually reduces with the passage of the maintenance time, by determining the maintenance duration of using the locally maintained time as the time synchronization source, it can be determined whether the time precision of the locally maintained time satisfies the synchronization time requirement.

In other embodiments, when the time precision of the base station satisfies the preset condition, the method further includes: updating the time synchronization message to the locally maintained time information.

In order to maintain the freshness of the locally maintained time, when the mobile terminal device determines that the time synchronization information in the broadcast information of the base station satisfies the time precision requirement, the mobile terminal device will update the time information of this synchronization to the locally maintained time information as an initial time of the locally maintained time.

In other embodiments, the broadcast message transmitted by the base station further includes time quality information, and a base station with the best time quality is selected as the time synchronization source according to the time quality information.

By selecting the optimal base station as the time synchronization source, the probability of loss of the synchronization clock source can be reduced, and the precision of time synchronization can be improved. Since the mobile terminal device usually receives the broadcast information transmitted by a plurality of base stations in the network environment where the mobile terminal device is located, in order to further improve the precision of time synchronization and the efficiency of time synchronization, the broadcast information transmitted by the base station further includes time quality information, and the mobile terminal device can select a base station with the best time quality information as the signal source of time synchronization during the selection of the base station.

The timing method over air interface for a mobile terminal device provided in this embodiment of the present disclosure includes: receiving a broadcast message transmitted by a base station, the broadcast message including a time synchronization message; when a synchronization time source is the time synchronization message, executing a time synchronization strategy to determine whether the time precision of the base station satisfies a preset condition; if the time precision of the base station satisfying the preset condition, continuously using the time synchronization message as the synchronization time source; and, if the time precision of the base station does not satisfy the preset condition, using locally maintained time information as the synchronization time source. The time synchronization strategy is executed to determine whether the time precision of the base station satisfies the preset condition. When the preset condition is satisfied, the synchronization time of the base station can be used, and the time synchronization message of the base station is used as the synchronization source; and, when the preset condition is not satisfied, the synchronization time of the base station cannot be used, and the locally maintained time information is used as the synchronization time source. Thus, the time synchronization of the mobile terminal device during the movement process is realized, and the time synchronization precision of the mobile terminal device during the movement process is also improved.

Example Embodiment Two

Figure 2:
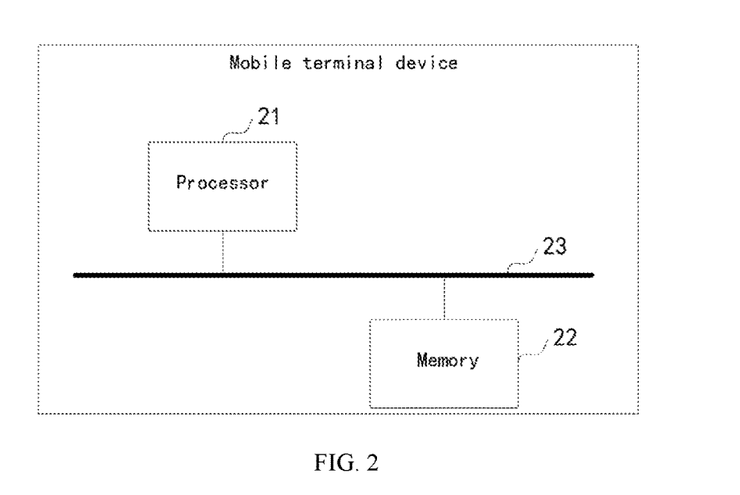
FIG. 2 is a schematic structural diagram of a mobile terminal device according to example Embodiment two of the present disclosure.

This embodiment further provides a mobile terminal device. As shown in FIG. 2, the mobile terminal device includes a processor 21, a memory 22 and a communication bus 23.

The communication bus 23 is configured to realize communication between the processor 21 and the memory 22.

The processor 21 is configured to execute at least one program stored in the memory 22 to perform the timing method over air interface for a mobile terminal device in the embodiments of the present disclosure.

This embodiment further provides a computer-readable storage medium. The computer-readable storage medium includes volatile or non-volatile and moveable or non-moveable medium implemented in any method or technology used to store information (such as computer-readable instructions, data structures, computer program modules or other data). The computer-readable storage medium includes, but not limited to, random access memories (RAMs), read-only memories (ROMs), electrically erasable programmable read only memories (EEPROMs), flash memories or other memory technologies, compact disc read-only memories (CD-ROMs), digital versatile disks (DVDs) or other optical disk memories, magnetic cassettes, magnetic tapes, magnetic disk memories or other magnetic memory devices, or any other medium that can be used to store desired information and can be accessed by computers.

The computer-readable storage medium in this embodiment can be configured to store at least one computer program which, when executed by a processor, causes the processor to implement at least one of the steps of the timing method over air interface for a mobile terminal device provided in the embodiments of the present disclosure.

Example Embodiment Three

In the present disclosure, based on the wireless communication technology and the timing over air interface technology, in an application scenario where a mobile terminal device or a terminal device switches the access network device, a timing method over air interface for a mobile terminal device is provided, and the optimal base station is selected for time synchronization according to the time quality value in the timing information (i.e., time synchronization information) transmitted by a base station. The specific implementation is given below, which includes the following steps S1 to S5.

Figure 3:
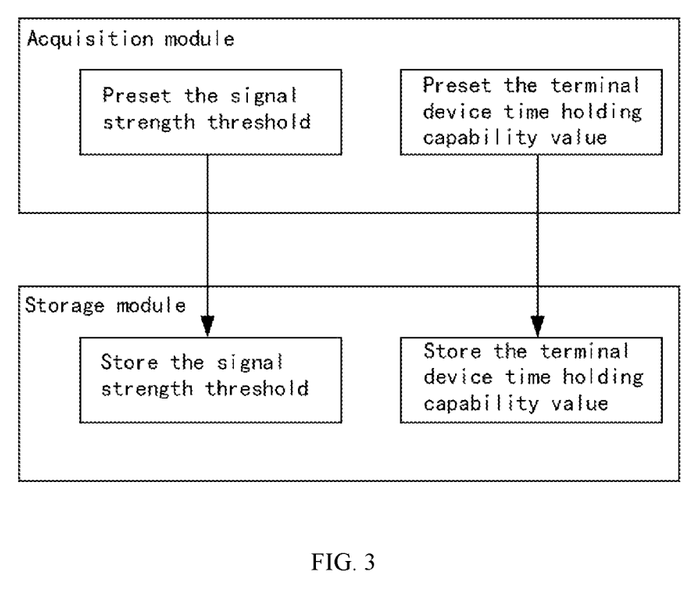
FIG. 3 is a flowchart of data acquisition and storage according to example Embodiment three of the present disclosure.

At S1, a signal strength threshold and a terminal device holding capability time value are preset in the mobile terminal device. The specific process is shown in FIG. 3 which is a flowchart of data acquisition and storage according to this embodiment, and includes the following operations 1 to 4.
1. A user writes a signal strength adjustment threshold into a data acquisition module according to application requirements.
2. A signal strength value is stored into a data storage module.
3. In accordance with the existing technical implementation scheme, the user presets a terminal device holding capability time value in the data acquisition module of the terminal device.
4. The holding capability time value is stored in the data storage module.

Figure 4:
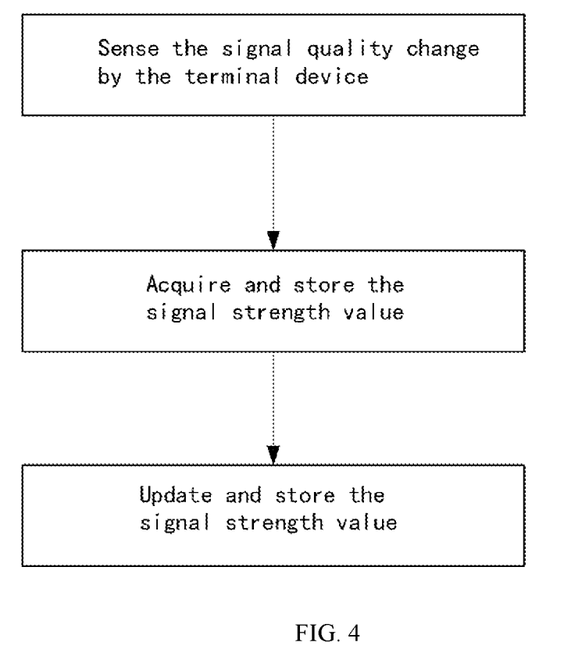
FIG. 4 is a flowchart of data acquisition and updating according to example Embodiment three of the present disclosure.

At S2, the terminal device acquires and updates signal strength information in real time. The specific process is shown in FIG. 4 which is a flowchart of data acquisition and updating according to this embodiment, and includes the following operations 1 to 4.
1. In an actual application environment, the signal quality of a base station changes with different signal coverage ranges.
2. The terminal device senses the change of the signal quality with different movement ranges.
3. The data acquisition module acquires the signal strength value and stores the signal strength value into the data storage module.
4. The data acquisition module of the terminal device reads and updates the signal strength value in the data storage module in real time according to the sensed information.

Figure 5:
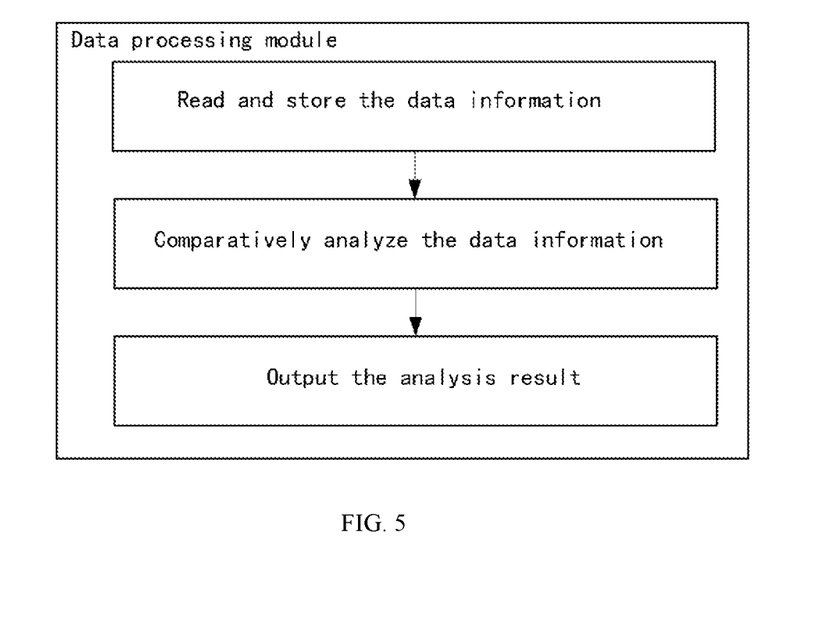
FIG. 5 is a flowchart of receiving, by a terminal device, a time synchronization signal from a base station according to example Embodiment three of the present disclosure.

At S3, the terminal device receives a time synchronization signal from the base station. The specific process is shown in FIG. 5 which is a flowchart of receiving, by the terminal device, a time synchronization signal from the base station according to this embodiment, and includes the following operations 1 to 2.
1. By utilizing the 5G communication technology as a data transmission medium and utilizing timing over air interface as the technical means, the base station broadcasts a system message.

2. By utilizing the 5G communication technology, the data acquisition module of the terminal device receives the system message broadcast by the base station through an air interface.

Figure 6:
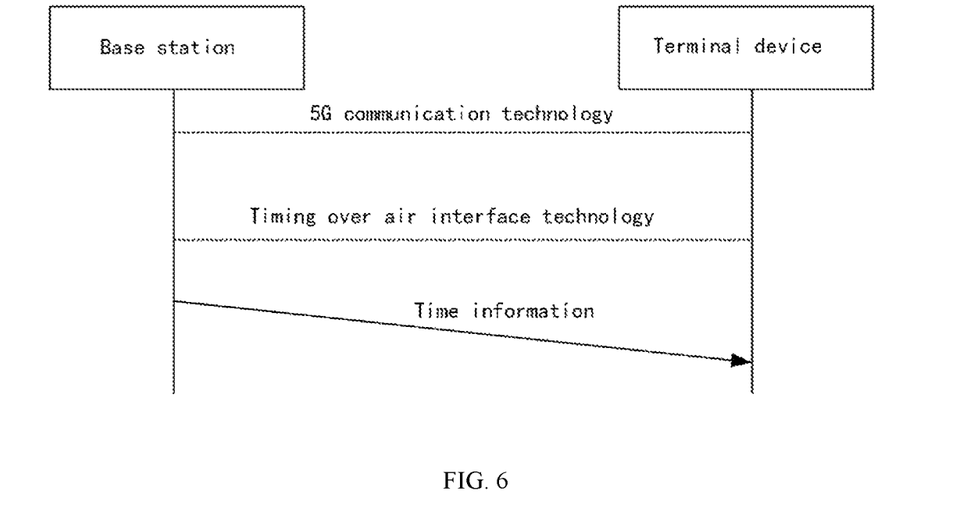
FIG. 6 is a flowchart of data processing according to example Embodiment three of the present disclosure.

At S4, a real-time change range value and a threshold of the signal strength information are comparatively analyzed, and the terminal device holding capability time value and the holding time are also comparatively analyzed. The specific process is shown in FIG. 6 which is a flowchart of data processing according to this embodiment, and includes the following operations 1 to 6.

1. The data processing module of the terminal device reads the signal strength threshold in the data storage module in real time.
2. The data processing module of the terminal device reads the real-time change range value of the signal strength information in the data storage module in real time.
3. The data processing module of the terminal device compares the signal strength threshold and the real-time change range value of the signal strength information.
4. The data processing module of the terminal device reads the terminal device holding capability time value in the data storage module in real time.
5. The data processing module of the terminal device compares the terminal device holding capability time value with a terminal device output holding time.
6. The data processing module of the terminal device identifies and compares the time quality information of different base stations.

Figure 7:
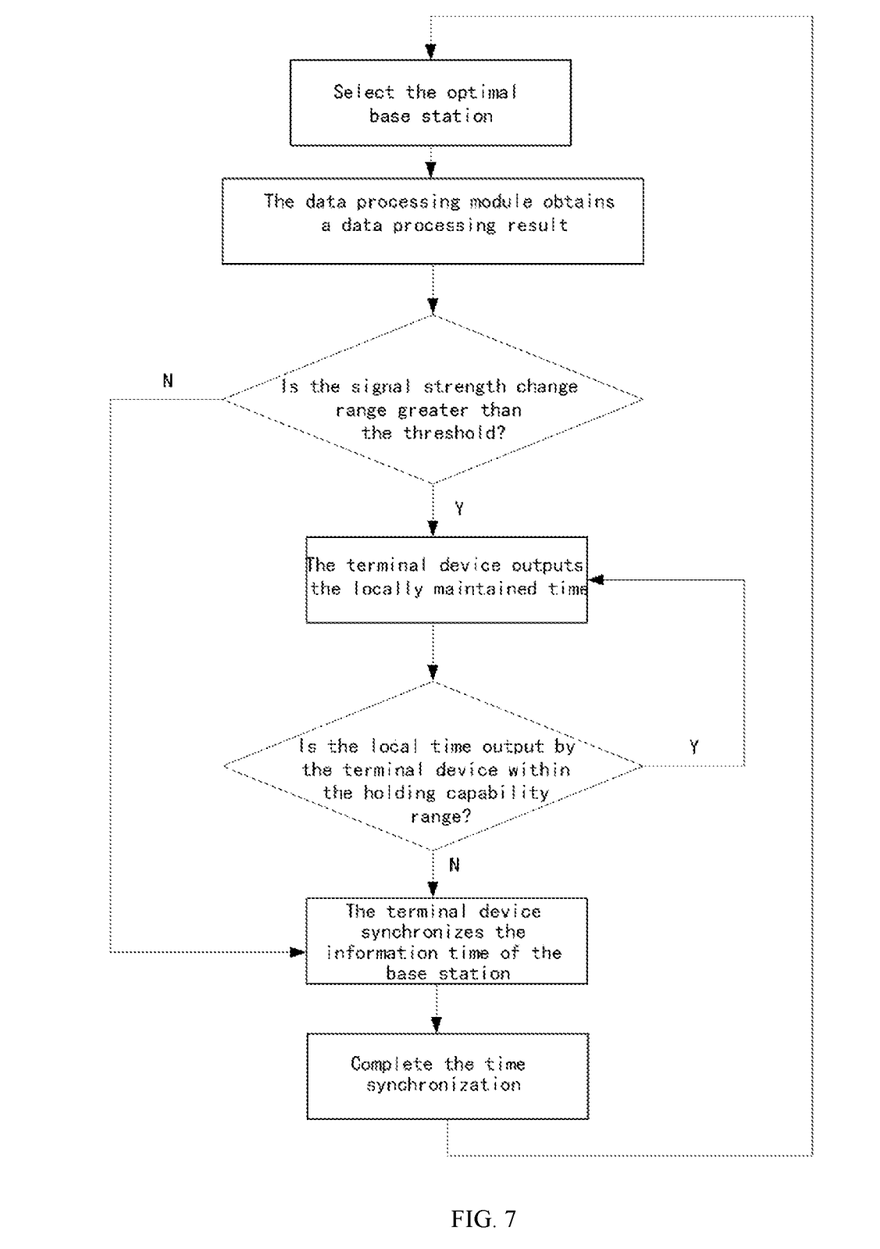
FIG. 7 is a flowchart of a terminal device dynamic timing strategy according to example Embodiment three of the present disclosure.

At S5, the terminal device dynamic timing strategy proposed in the present disclosure is executed according to analysis result of the data processing module, and the optimal base station is selected for time synchronization according to the time quality value in the system information broadcast by the base station. The specific process is shown in FIG. 7 which is a flowchart of the terminal device dynamic timing strategy according to this embodiment, and includes the following operations 1 to 6.

1. The optimal base station is selected for time synchronization according to the analysis result of the data processing module.
2. In accordance with the analysis result of the data processing module, when the real-time change range value of the signal strength information is greater than the signal strength threshold, a data output module of the terminal device outputs the locally maintained time to maintain the time synchronization precision.
3. In accordance with the analysis result of the data processing module, when it is detected that the terminal device keeps an output local time within a terminal device holding capability range, the data output module of the terminal device continuously outputs the locally maintained time.
4. In accordance with the analysis result of the data processing module, when it is detected that the terminal device keeps the output local time to exceed the terminal device holding capability, the terminal device instantly synchronizes the time information of the base station, and the data output module of the terminal device outputs the synchronized time information of the base station.
5. In accordance with the analysis result of the data processing module, when it is detected within the terminal device holding capability range that the change range of the signal strength value is stable within a set threshold, it can be considered that the terminal device moves within the signal strength range of the same scenario, and the terminal device synchronizes the time information of the base station at this time. The data output module of the terminal device outputs the synchronized time information of the base station.
6. The terminal device completes the time synchronization, and returns to the S1 at the end of time synchronization for a next time synchronization.

In the timing method over air interface for a mobile terminal device provided by the present disclosure, when the terminal device is within the signal strength ranges of difference scenarios, the locally maintained time is output to maintain the time synchronization precision. When it is detected within the terminal device holding capability range that the change range of the signal strength value is stable within the set threshold, it can be considered that the terminal device moves within the signal strength range of the same scenario, and the terminal device synchronizes the time information of the base station at this time. When it is detected that the terminal device keeps the output local time to exceed the terminal device holding capability, the terminal device instantly synchronizes the time information of the base station. Meanwhile, the terminal device selects, according to the time quality value in the system information broadcast by different base stations, the optimal base station for time synchronization.

The embodiments of the present disclosure provide the timing method over air interface for a mobile terminal device, the mobile terminal device and the readable storage medium. The method includes: receiving a broadcast message transmitted by a base station, the broadcast message including a time synchronization message; when a synchronization time source is the time synchronization message, executing a time synchronization strategy to determine whether the time precision of the base station satisfies a preset condition; if the time precision of the base station satisfies the preset condition, continuously using the time synchronization message as the synchronization time source; and, if the time precision of the base station does not satisfy the preset condition, using locally maintained time information as the synchronization time source. The time synchronization strategy is executed to determine whether the time precision of the base station satisfies the preset condition. When the preset condition is satisfied, the synchronization time of the base station can be used, and the time synchronization message of the base station is used as the synchronization source; and, when the preset condition is not satisfied, the synchronization time of the base station cannot be used, and the locally maintained time information is used as the synchronization time source. Thus, the time synchronization of the mobile terminal device during the movement process is realized, and the time synchronization precision of the mobile terminal device during the movement process is also improved.

In accordance with the above embodiments, it should be understood by those having ordinary skills in the art that all or some of the steps in the methods disclosed above and the functional modules/units in the systems and apparatuses disclosed above can be implemented as software (which can be implemented by computer program codes executable by computing devices), firmware, hardware and suitable combinations thereof. In the hardware implementation, the division of the functional modules/units mentioned above does not necessarily correspond to the division of physical components. For example, one physical component may have a plurality of functions, or one function or step may be cooperatively executed by a number of physical components. Some or all of the physical components may be implemented as software executed by processors such as central processors, digital signal processors or microprocessors, or implemented as hardware, or implemented as integrated circuits such as application-specific integrated circuits.

In addition, as well-known to those having ordinary skills in the art, the communication medium generally contains computer-readable instructions, data structures, computer program modules or other data in modulation data signals such as carriers or other transmission mechanisms, and may include any information transfer medium. Therefore, the present disclosure is not limited to any particular combination of hardware and software.

The above is a further detailed description of the embodiments of the present disclosure in conjunction with the specific implementations, and the specific implementations of the present disclosure cannot be deemed as being limited thereto. Those having ordinary skills in the art may make some simple deductions or replacements without departing from the concept of the present disclosure, and all the simple deductions or replacements shall fall into the protection scope of the present disclosure.

What is claimed is:

1. A method for selecting synchronization time source over air interface for a mobile terminal device, comprising:
   receiving a broadcast message transmitted by a base station among a plurality of base stations, the broadcast message comprising a time synchronization message;
   in response to the time synchronization message being a synchronization time source, executing a time synchronization strategy to determine whether time precision of the base station satisfies a preset condition;
   in response to the time precision of the base station satisfying the preset condition, continuously using the time synchronization message as the synchronization time source; and
   in response to the time precision of the base station not satisfying the preset condition, using locally maintained time information as the synchronization time source.

2. The method of claim 1, wherein executing a time synchronization strategy to determine whether time precision of the base station satisfies a preset condition comprises:
   acquiring and updating a signal strength of the base station in real time,
      determining whether a change value of the signal strength is greater than or equal to a preset strength change threshold,
      determining that the time precision of the base station does not satisfy the preset condition in response to the change value of the signal strength being greater than or equal to the preset strength change threshold, and
      determining that the time precision of the base station satisfies the preset condition in response to the change value of the signal strength being less than the preset strength change threshold; or,
   acquiring and updating, by the mobile terminal device, the signal strength of the base station in real time,
      determining whether a value of the signal strength is greater than or equal to a preset signal strength threshold,
      determining that the time precision of the base station satisfies the preset condition in response to the value of the signal strength being greater than or equal to the preset signal strength threshold, and
      determining that the time precision of the base station does not satisfy the preset condition in response to the value of the signal strength being less than the preset signal strength threshold.

3. The method of claim 2, wherein in response to the time precision of the base station not satisfying the preset condition, the method further comprises:
   determining whether the locally maintained time information satisfies a precision holding threshold;
   in response to the locally maintained time information satisfying the precision holding threshold, using the locally maintained time information as the synchronization time source; and
   in response to the locally maintained time information not satisfying the precision holding threshold, continuously using the time synchronization message as the synchronization time source.

4. The method of claim 3, wherein the precision holding threshold comprises:
   a maintenance duration threshold using the locally maintained time as the time synchronization source.

5. The method of claim 2, wherein in response to using the locally maintained time information as the synchronization time source, the method further comprises:
   determining whether the locally maintained time information satisfies a precision holding threshold;
   in response to the locally maintained time information satisfying the precision holding threshold, continuously using the locally maintained time information as the synchronization time source; and
   in response to the locally maintained time information not satisfying the precision holding threshold, receiving another broadcast message transmitted by the base station, and using a time synchronization message of the base station as the synchronization time source.

6. The method of claim 2, wherein in response to using the time synchronization message as the synchronization time source, the method further comprises:
   reading locally maintained time information in real time, and determining whether the locally maintained time information satisfies a precision holding threshold;
   in response to the locally maintained time information satisfying the precision holding threshold, keeping the locally maintained time information unchanged; and
   in response to the locally maintained time information not satisfying the precision holding threshold, receiving a broadcast message transmitted by the base station, and using the time synchronization message of the base station as the synchronization time source.

7. The method of claim 1, wherein in response to the time precision of the base station satisfying the preset condition, the method further comprises:
   updating the time synchronization message to the locally maintained time information.

8. The method of claim 1, wherein the broadcast message further comprises time quality information; and
   a base station among the plurality of base stations with the best time quality is selected as the time synchronization source according to the time quality information.

9. A mobile terminal device, comprising:
   a processor, a memory and a communication bus, wherein:

the communication bus is configured to realize communication between the processor and the memory; and the processor is configured to execute at least one program stored in the memory to perform a method for selecting synchronization time source over air interface for a mobile terminal device comprising:

receiving a broadcast message transmitted by a base station among a plurality of base stations, the broadcast message comprising a time synchronization message;

in response to the time synchronization message being a synchronization time source, executing a time synchronization strategy to determine whether time precision of the base station satisfies a preset condition;

in response to the time precision of the base station satisfying the preset condition, continuously using the time synchronization message as the synchronization time source; and in response to the time precision of the base station not satisfying the preset condition, using locally maintained time information as the synchronization time source.

10. The mobile terminal device of claim 9, wherein executing a time synchronization strategy to determine whether time precision of the base station satisfies a preset condition comprises:

acquiring and updating a signal strength of the base station in real time,
  determining whether a change value of the signal strength is greater than or equal to a preset strength change threshold,
  determining that the time precision of the base station does not satisfy the preset condition in response to the change value of the signal strength being greater than or equal to the preset strength change threshold, and
  determining that the time precision of the base station satisfies the preset condition in response to the change value of the signal strength being less than the preset strength change threshold; or, acquiring and updating, by the mobile terminal device, the signal strength of the base station in real time,
  determining whether a value of the signal strength is greater than or equal to a preset signal strength threshold,
  determining that the time precision of the base station satisfies the preset condition in response to the value of the signal strength being greater than or equal to the preset signal strength threshold, and
  determining that the time precision of the base station does not satisfy the preset condition in response to the value of the signal strength being less than the preset signal strength threshold.

11. The mobile terminal device of claim 10, wherein in response to the time precision of the base station not satisfying the preset condition, the method further comprises:

determining whether the locally maintained time information satisfies a precision holding threshold;

in response to the locally maintained time information satisfying the precision holding threshold, using the locally maintained time information as the synchronization time source; and in response to the locally maintained time information not satisfying the precision holding threshold, continuously using the time synchronization message as the synchronization time source.

12. The mobile terminal device of claim 11, wherein the precision holding threshold comprises:

a maintenance duration threshold using the locally maintained time as the time synchronization source.

13. The mobile terminal device of claim 10, wherein in response to using the locally maintained time information as the synchronization time source, the method further comprises:

determining whether the locally maintained time information satisfies a precision holding threshold;

in response to the locally maintained time information satisfying the precision holding threshold, continuously using the locally maintained time information as the synchronization time source; and in response to the locally maintained time information not satisfying the precision holding threshold, receiving another broadcast message transmitted by the base station, and using a time synchronization message of the base station as the synchronization time source.

14. The mobile terminal device of claim 10, wherein in response to using the time synchronization message as the synchronization time source, the method further comprises:

reading locally maintained time information in real time, and determining whether the locally maintained time information satisfies a precision holding threshold;

in response to the locally maintained time information satisfying the precision holding threshold, keeping the locally maintained time information unchanged; and in response to the locally maintained time information not satisfying the precision holding threshold, receiving a broadcast message transmitted by the base station, and using the time synchronization message of the base station as the synchronization time source.

15. The mobile terminal device of claim 9, wherein in response to the time precision of the base station satisfying the preset condition, the method further comprises:

updating the time synchronization message to the locally maintained time information.

16. The mobile terminal device of claim 9, wherein the broadcast message further comprises time quality information; and a base station among the plurality of base stations with the best time quality is selected as the time synchronization source according to the time quality information.

17. A non-transitory computer-readable storage medium, storing at least one computer program which, when executed by at least one processor, causes the at least one processor to perform a method for selecting synchronization time source over air interface for a mobile terminal device comprising:

receiving a broadcast message transmitted by a base station among a plurality of base stations, the broadcast message comprising a time synchronization message;

in response to the time synchronization message being a synchronization time source, executing a time synchronization strategy to determine whether time precision of the base station satisfies a preset condition;

in response to the time precision of the base station satisfying the preset condition, continuously using the time synchronization message as the synchronization time source; and in response to the time precision of the base station not satisfying the preset condition, using locally maintained time information as the synchronization time source.

18. The non-transitory computer-readable storage medium of claim 17, wherein executing a time synchronization strategy to determine whether time precision of the base station satisfies a preset condition comprises:
   acquiring and updating a signal strength of the base station in real time,
      determining whether a change value of the signal strength is greater than or equal to a preset strength change threshold,
      determining that the time precision of the base station does not satisfy the preset condition in response to the change value of the signal strength being greater than or equal to the preset strength change threshold, and
      determining that the time precision of the base station satisfies the preset condition in response to the change value of the signal strength being less than the preset strength change threshold; or,
   acquiring and updating, by the mobile terminal device, the signal strength of the base station in real time,
      determining whether a value of the signal strength is greater than or equal to a preset signal strength threshold,
      determining that the time precision of the base station satisfies the preset condition in response to the value of the signal strength being greater than or equal to the preset signal strength threshold, and
      determining that the time precision of the base station does not satisfy the preset condition in response to the value of the signal strength being less than the preset signal strength threshold.

19. The non-transitory computer-readable storage medium of claim 18, wherein in response to the time precision of the base station not satisfying the preset condition, the method further comprises:
   determining whether the locally maintained time information satisfies a precision holding threshold;
   in response to the locally maintained time information satisfying the precision holding threshold, using the locally maintained time information as the synchronization time source; and
   in response to the locally maintained time information not satisfying the precision holding threshold, continuously using the time synchronization message as the synchronization time source.

20. The non-transitory computer-readable storage medium of claim 18, wherein in response to using the locally maintained time information as the synchronization time source, the method further comprises:
   determining whether the locally maintained time information satisfies a precision holding threshold;
   in response to the locally maintained time information satisfying the precision holding threshold, continuously using the locally maintained time information as the synchronization time source; and
   in response to the locally maintained time information not satisfying the precision holding threshold, receiving another broadcast message transmitted by the base station, and using a time synchronization message of the base station as the synchronization time source.

* * * * *